Patented Jan. 29, 1952

2,584,001

UNITED STATES PATENT OFFICE 2,584,001

CYCLOPENTANOPOLYHYDROPHENAN-
THRENE DERIVATIVES

Maximilian R. Ehrenstein, Philadelphia, Pa., assignor to The Trustees of the University of Pennsylvania, Philadelphia, Pa., a corporation of Pennsylvania No Drawing. Application December 20, 1950,
Serial No. 201,887

7 Claims. (Cl. 260—239.55)

This invention is in the art of cyclopentanopolyhydrophenanthrenes and concerns specifically a group of estranes in it, which are derivatives of, and include 3,5-dihydroxy-10-hydroxymethyl-17-carboxy-estrane, and which group embraces primarily three major types of derivatives, namely: (a) those in which there is no unsaturation between the carbon atoms in the 8-, 14- and 15-positions; (b) those in which there is an oxygen linkage between the 8- and 19-carbon atoms; and (c) those in which there is a double bond linkage between the carbon atoms in the 14- and 15-positions. In addition to these three major types of derivatives, within each of the types are included also those derivatives in which (1) the hydroxyl groups and the 17-carboxyl group remain unchanged; and (2) those in which the hydroxyl groups remain unchanged but the 17-carboxyl group is esterified, particularly with an alkyl or an aralkyl alcohol, and thereby converted to a carbalkoxy or carbaralkoxy group; and also those (3) in which in addition to the 17-carbalkoxy or -carbaralkoxy group, both the hydroxyl group linked to the 3-carbon atom and the one (if present) linked to the 19-carbon atom are esterified with particularly a carboxylic acid (either aromatic, aralkyl, or a fatty acid), whereby both are converted to an acyloxy group, although this esterification can also be with an aromatic sulfonic acid; as well as those (4) in which the 5-hydroxy, and the 17-carboxy groups remain intact but the 3-hydroxy group and the 19-hydroxy group (if present) are esterified under ordinary mild esterification conditions for conversion to either a carboxylic acid ester or an aryl sulfonic acid ester group.

Accordingly, the products of the invention include (I) the 17-carbalkoxy derivatives of the above thre different major types of 3,5-dihydroxy-10-hydroxy-methyl compounds, namely, of (a) 3,5,19-trihydroxy-etiocholanic acid, and of (b) the one having the carbon atoms in the 8- and 19-positions linked by oxygen with only a single bond linking the carbon atoms in the 14- and 15-positions, as well as (c) the other having the carbon atoms in the 8- and 14-positions linked only by a single bond while those in the 14- and 15-positions are linked by a double bond; and (II) the 17-free carboxylic acid of each of the three types included under (I); and also (III) the 17-alkyl and -aralkyl esters of the 3,19-dialkoyloxy-5-hydroxy-etiocholanic acid; as well as (IV) those in which the 3-hydroxyl group and the one in the 19-hydroxyl group are both esterified, in the manner described in the latter part of the preceding paragraph, for example, by use of a carboxylic acid anhydride or an aryl sulfonic acid.

The above described various types of compounds included in the group embraced by the invention are obtained by a procedure commencing with 3,5,14,19-tetrahydroxy-14-isoetiocholanic acid, the preparation of which is described in detail in my application Serial No. 666,191, filed April 30, 1946, now Patent No. 2,518,672.

In the procedure for obtaining the products of the invention, the 3,5,14,19-tetrahydroxy-14-isoetiocholanic acid is first subjected to dehydration, for example, by the use of an alcohol, preferably an absolute lower alkyl alcohol as ethyl alcohol, acidulated with mineral acid such as sulfuric acid or preferably hydrogen chloride, and preferably under anhydrous conditions, whereby the hydroxyl group in the 14-position of the starting material is removed with resulting (a) formation of an oxygen linkage between the 8- and 19-carbon atoms or (b) unsaturation between the 14- and 15-carbon atoms, and largely with concurrent esterification of the 17-carboxy group to a carbalkoxy group. This dehydration (removal of the hydroxyl from the 14-carbon) resulting in the indicated unsaturation or formation of an ether bridge, and accompanied by the simultaneous esterification of the 17-carboxyl group is a unique feature of this invention.

In the subsequent working up of the reaction products of the dehydration step, there are obtained neutral products to the extent of about 85% and acid products to the extent of about 15%. From the neutral products by subsequent teratment there are isolated the two alkyl etiocholenic or etiocholanic acid esters (the one with the oxido linkage between the 8- and 19-carbon atoms, and the other with $\Delta^{14}$-unsaturation). By subsequent catalytic hydrogenation, using platinum (or palladium, rhodium, or nickel), the $\Delta^{14}$- ester is saturated to the corresponding alkyl 3,5,19-trihydroxy-etiocholanate. By subsequent saponification, from each of these types of esters, there is obtained the corresponding etiocholanic acid.

Among the approximately 15% of acid products of the dehydration, there can be found the corresponding free $\Delta^{14}$-etiocholenic acid.

Each of the above noted three free acids, (a) the saturated one, (b) the oxygen bridged one, and (c) the one that is unsaturated, can be esterified through the 17-carboxyl group by reaction with a diazo reagent, such as a diazo alkane to give the corresponding alkyl ester, or with an aryl diazonium salt to give the corresponding aryl ester, or by esterification with an alcohol such as an aralkyl alcohol as benzyl alcohol, to give the corresponding aralkyl ester.

The alkyl 3,5,19-trihydroxy-etiocholanate, and also the $\Delta^{14}$-unsaturated ester, can be further esterified at both the 3-hydroxyl group and the 19-hydroxyl group, for example, with a fatty, aromatic or arylaliphatic acid, or with an aromatic sulfonic acid, or any of the types of free acids can be similarly esterified at the same two hydroxyl groups and with the 5-hydroxyl and the 17-carboxyl groups remaining intact.

The invention is illustrated by, but not restricted to, the following examples:

*Example I.—Ethyl 3,5,19-trihydroxy-$\Delta^{14}$-etiocholenate*

2.5088 grams of crystalline 3,5,14,19-tetrahydroxy-14-isoetiocholanic acid having the structure:

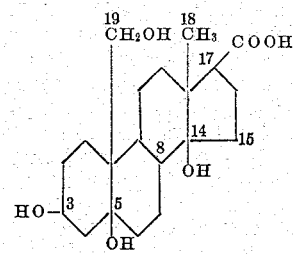

was dissolved in 240 cc. of a one-tenth normal solution of hydrogen chloride in absolute alcohol. The resulting solution was kept at room temperature for 35 minutes, and then subjected to a slow distillation begun at atmospheric pressure and under anhydrous conditions by using a paraffin bath which was kept at between 103° and 105° C. throughout the entire distillation which ran for 95 minutes. To the distillation residue, 75–80 cc. of a light golden solution, 50 cc. of water was added and the distillation then continued under vacuum (45–47° C.) until a distinct turbidity appeared. The material causing the turbidity was brought back into the solution by briefly heating the mixture on a water bath. The solution was then allowed to stand overnight at room temperature, resulting in the separation of some oily material and also macrocrystalline needles. Since the crystals were partly embedded in the oil, as much of the oil as possible was decanted from the mixture without taking over crystals, and adhering oil was removed from the oil and crystal mixture by washing the mixture by decantation with several portions of one to one aqueous alcohol until the crystals were left in their colorless form.

All of these decantates were combined and the alcohol removed completely by distillation under vacuum. A light yellow precipitate formed in the aqueous mixture in the distillation flask and the whole mixture was shaken up with 175 cc. of ether. The aqueous layer was removed and then extracted four times with separate 75 cc. portions of ether. These four ether extracts were combined with the original ether layer, and the whole was then washed six times, each with 5 cc. of water, and then dried with anhydrous sodium sulfate and filtered. After removing the ether under vacuum from the filtrate, the residue was a brittle foam of dry weight 2.3531 grams. This residue was then divided into approximately two equal parts for convenience in further processing. These are identified oily residue A and oily residue B.

Oily residue A was separated into its neutral and acid portions by dissolving 1.2273 grams of it in 140 cc. of ether and extracting it first with 10 cc. and then 5 cc. of a 5% solution of sodium carbonate and then five times with 2 cc. portions each of water, thereby removing the acid portion. The neutral part remained in the ether solution which was then dried with anhydrous sodium sulfate and filtered. The ether was then removed under vacuum and the dry residue, neutral portion, was a colorless brittle foam weighing 1.0177 grams.

This dry residue, neutral portion, was dissolved in 5 cc. of ether to a clear, yellowish solution, to which some petroleum ether was added a drop or two at a time, with shaking, over the course of 8 hours, during which very gradually some hard, white crystalline material deposited on the walls of the flask. The amount increased on standing over night. The following morning the crystals were filtered off and washed with ether containing petroleum ether, and then worked up to isolate their specific product content as described in Example XVII (column 17).

To the mother liquor (filtrate from these crystals) was added petroleum ether, in the same way as above over a period of several hours, resulting in the precipitation of only resinous material. This was not separated but rather brought to dryness together with the supernatant solution to give as a dry residue 0.9473 gram of a brittle foam containing more than one substance, but mainly crude ethyl 3,5,19-trihydroxy-$\Delta^{14}$-etiocholenate, showing optical rotation $$[\alpha]_D^{23.5}+46.4°$$

(20.0 mg. in 2.0 cc. of chloroform). The chloroform solution of the substance gave a yellow color with tetranitromethane, indicating the unsaturated character. In a repeat run, the resinous material, precipitated on the addition of petroleum ether, was separated and taken up in acetone, from which it crystallized in flat prisms.

Still another run was carried through the dehydration to the point of obtaining the oily residue A. After removing from the neutral portion of the oily residue A the crystalline substance contained in it (as mentioned in the second paragraph above), the resulting filtrate was brought to dryness. This dry residue was taken up in acetone, and on crystallization from the solution substantial quantities of flat prisms of ethyl 3,5,19-trihydroxy-$\Delta^{14}$-etiocholenate were obtained, having the structure:

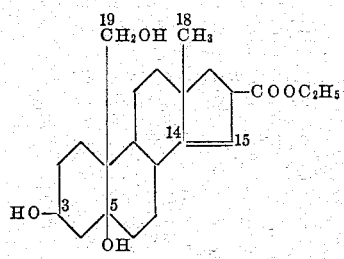

The recrystallized crops from three separate runs melted respectively at 187–189° C., 189–191° C., and 190–191.5° C. The chloroform solution of each of these three crops of crystals gave a distinct yellow color with tetranitromethane. Their optical rotation was $[\alpha]_D^{22}+48.9°$ (20.0 mg. in 2.0 cc. of chloroform).

Example II.—Ethyl 3,5-dihydroxy-8,19-oxido-etiocholanate

The dry residue (brittle foam) resulting from drying the mother liquor, as described in the first two sentences of the second paragraph above, was found to contain the two types of substances possible from the dehydration involving the removal of the hydroxyl group originally attached to the 14-carbon, namely, (1) the product having an oxygen linkage between the 8- and 19-carbon atoms, together with (2) the product having $\Delta^{14}$-unsaturation. It is believed that the 8,19-oxido compound results from the immediately prior formation of an 8,14-unsaturated compound, namely, ethyl 3,5,19-trihydroxy-$\Delta^{8,14}$-etiocholenate, having the structure:

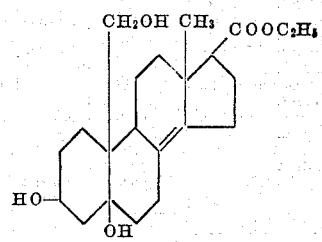

This latter compound is believed to be unstable and to undergo immediate rearrangement to form the oxido compound ethyl 3,5-dihydroxy-8,19-oxido-etiocholanate, having the structure:

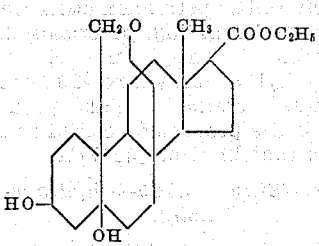

This oxido substance was isolated as follows:

A suspension of 350 milligrams of platinum oxide in 4.5 cc. of glacial acetic acid was reduced by shaking it in an atmosphere of hydrogen. To the resulting platinum suspension was added 0.8505 gram of the above described (brittle foam) dry residue, in 10 cc. glacial acetic acid, and the shaking continued at room temperature (23° C.) in the atmosphere of hydrogen for three and one-half hours. Total hydrogen absorption was 55.2 cc. with about 50 cc. absorbed during the first hour.

The catalyst was filtered off from the hydrogenation mixture and the glacial acetic acid was removed from the filtrate solution by quickly bringing the solution down to dryness under vacuum (45–50° C.). To the resulting syrupy residue, 5 cc. of water was added at once. After standing over night, the entire content was extracted twice with 60 cc. portions each of ethyl acetate and the combined extracts were washed neutral with three 3 cc. portions each of a 5% solution of sodium carbonate followed 6 times with 2.5 cc. each of water, and then dried with anhydrous sodium sulfate and filtered. The resulting filtrate was evaporated to dryness, yielding a resinous residue of 0.8278 gram.

0.6937 gram of this resinous residue was dissolved in 70 cc. of ether and fractionated by chromatographic adsorption by filtration within one hour through a 20 millimeter diameter column holding 19 grams of Brockmann aluminum oxide, followed successively by the following eluates, each filtering within 25 minutes:

CHROMATOGRAPHIC FRACTIONATION

| No. of Fraction | Solvent | Weight of Residue g. | Appearance of Residue |
|---|---|---|---|
| 1 | 70 cc. ether (original solution). | 0.0201 | resinous. |
| 2 | 40 cc. ether + 30 cc. acetone. | 0.0912 | slightly yellow, partly crystalline. |
| 3 | 20 cc. ether + 50 cc. acetone. | 0.0103 | yellow, crystalline. |
| 4 | 70 cc. acetone | 0.0402 | microcrystalline. |
| 5 | 70 cc. acetone + 0.2 cc. methanol. | 0.0451 | partly crystalline resin. |
| 6 | 70 cc. acetone + 0.3 cc. methanol. | 0.0689 | crystalline. |
| 7 | 70 cc. acetone + 0.5 cc. methanol. | 0.0733 | Do. |
| 8 | 69 cc. acetone + 1 cc. methanol. | 0.0775 | Do. |
| 9 | 68 cc. acetone + 2 cc. methanol. | 0.0895 | partly crystalline resin. |
| 10 | 65 cc. acetone + 5 cc. methanol. | 0.0958 | resinous. |
| 11 | 50 cc. acetone + 20 cc. methanol. | 0.0407 | brittle foam. |
| 12 | 70 cc. methanol | 0.0235 | amorphous. |
| | Total | 0.6761 | |

The residue from each of the eluates was separately dissolved in acetone, and in some instances, petroleum ether was added to induce crystallization, with the following results.

While no crystalline substance could be secured from fraction 3, fractions 2 and 4 together furnished a total of 9.2 milligrams (respectively 2.9 mg. and 6.3 mg.) of needle-shaped crystals of ethyl 3,5-dihydroxy-8,19-oxido-etiocholanate melting at 189–194° C. An additional crop of 6.9 milligrams of somewhat less pure material, melted at 184–188° C. The total of 16.1 milligrams was identified as the substance named, and gave no depression of melting point when mixed with the authentic samples of the same substance.

Example III.—Ethyl 3,5,19-trihydroxy-etiocholanate

It was possible in the chromatographic adsorption to isolate the compound of Example II as a product of the dehydration because, during the hydrogenation that followed, it retained its structure. However, its isomer, formed also during the dehydration, had its $\Delta^{14}$ double bond reduced by saturation during the hydrogenation. Accordingly, from fractions 6 through 10 of the chromatographic adsorption eluates, there was obtained a total of 0.1255 gram of needle-shaped crystals identified as ethyl 3,5,19-trihydroxy-etiocholanate melting between 178 and 182° C. and having the structure:

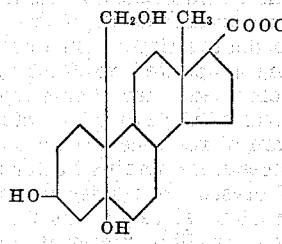

In addition, from mother liquors from these crystallizations there was obtained a total of 0.0457 gram, which, while of almost the same purity, had melting points between 175 and 178° C. However, the identity of the compound in all of these fractions was shown by mixed melting point determinations. While the total yield then was 0.1712 gram, the yield apparently can be somewhat increased by subjecting the contents of the mother liquors left from the crystallization from these fractions to subsequent chromatographic separation.

In the second paragraph of Example I above, it was noted that the oily residue obtained from the reaction mixture resulting from the dehydration step was divided merely for convenience into two parts. The preceding examples were carried out primarily from working with the portion designated as oily residue A. The following Examples IV—VI result from working up an oily residue B portion. The methods in these particular examples appear less convenient than those in the preceding examples but yielded a number of chemically pure compositions which served as reference samples. The residue B was not separated into an acid fraction and a neutral fraction as was the resinous, oily residue A, but was subjected directly to catalytic hydrogenation.

*Example IV.—Ethyl 3,5-dihydroxy-8,19-oxido-etiocholanate*

455 milligrams of platinum oxide were suspended in 7 cc. of glacial acetic acid and while being shaken were reduced in an atmosphere of hydrogen. Then a solution of 1.1258 grams of oily residue B in 12 cc. of glacial acetic acid was added and the shaking continued in the atmosphere of hydrogen at room temperature (23° C.) for three and one-half hours, after which the hydrogenation came to a standstill. Total hydrogen absorption was 65.8 cc., of which 62.5 cc. were absorbed during the first hour and one-half. The platinum was filtered off and the filtrate solution was concentrated under vacuum (about 52° C.) to a slightly turbid, colorless syrup, to which 5 cc. of water was added immediately. The next day this sticky material was taken up in 100 cc. of ethyl acetate and the resulting solution washed with 6 cc. and then two 2 cc. portions each of water.

The thus washed ethyl acetate solution was then separated into a neutral fraction and an acid fraction by taking out the acid material by extraction, successively with 10 cc. and then 5 cc. of a 5% solution of sodium carbonate and then 5 times with 2 cc. portions each of water. The remaining ethyl acetate solution containing the neutral fraction was dried with anhydrous sodium sulfate, filtered and evaporated to dryness with the later portion of the evaporation conducted under vacuum.

The thus dried neutral residue, which was a white, largely crystalline cake weighing 0.962 gram, was stirred up in some ether which dissolved out the ether-soluble portion, leaving some crystalline material undissolved. The latter was filtered off, washed a few times with a little ether, and after drying amounted to 0.603 gram of crystals. The combined ether filtrate and washings, after removal of the ether by evaporation, yielded 0.318 gram of resinous, brittle foam. No uniform substances were obtained after subjecting this crop of crystals to numerous recrystallizations from various solvents, but 0.512 gram of non-uniform crystalline material and 0.082 gram of an amorphous, brittle foam resulted.

The 0.512 gram of this last crystalline material was then elaborately purified by chromatographic adsorption, passing a solution of it in 60 cc. of benzene within a period of three hours through 15 grams of Brockmann aluminum oxide in a column of 19 mm. diameter. Of the following eluates, the first four were passed through the column within an hour each and the other within about 35 minutes each.

CHROMATOGRAPHIC FRACTIONATION

| No. of Fraction | Solvent | Weight of Residue g. | Appearance of Residue |
|---|---|---|---|
| 1 | 60 cc. benzene (original solution) | 0.0006 | greasy. |
| 2 | 45 cc. benzene+15 cc. ether | 0.0020 | resinous. |
| 3 | 15 cc. benzene+45 cc. ether | 0.0073 | partly crystalline, resin. |
| 4 | 60 cc. ether | 0.0161 | partly crystalline, yellowish resin. |
| 5 | 40 cc. ether+20 cc. acetone | 0.0127 | yellowish crystals. |
| 6 | 20 cc. ether+40 cc. acetone | 0.0067 | resinous. |
| 7 | 60 cc. acetone | 0.0102 | crystalline. |
| 8 | 60 cc. acetone+0.15 cc. methanol | 0.0275 | Do. |
| 9 | 60 cc. acetone+0.20 cc. methanol | 0.0444 | Do. |
| 10 | 60 cc. acetone+0.30 cc. methanol | 0.0414 | large crystals. |
| 11 | 60 cc. acetone+0.50 cc. methanol | 0.0464 | Do. |
| 12 | 58 cc. acetone+2 cc. methanol | 0.1134 | crystalline. |
| 13 | 55 cc. acetone+5 cc. methanol | 0.0944 | brittle foam. |
| 14 | 45 cc. acetone+15 cc. methanol | 0.0409 | resinous. |
| 15 | 60 cc. methanol | 0.0235 | essentially crystalline. |
| Total | | 0.4878 | |

The fractions 4 and 5 residues from the preceding chromatographic fractionation were combined and dissolved in a very small volume of acetone to which a little petroleum ether was added. After a few days' standing, practically 3.9 milligrams of stout, slightly yellowish, prismatic crystals of ethyl 3,5-dihydroxy-8,19-oxido-etiocholanate was obtained. This product was identical with the product described in Example II as well as that in Example VIII.

*Example V.—Ethyl 3,5,19-trihydroxy-etiocholanate*

The fractions 8 through 11 residues were separately dissolved in acetone and on a water bath concentrated to a small volume. On standing at room temperature, in some instances after the addition of a little petroleum ether, long, flat, rather stout prismatic crystals separated, and after filtering and concentrating the mother liquors, additional crystal crops were obtained by analogous treatment. Nine crystalline fractions, totaling 0.1228 gram, contained identical material melting about 185° C. The crop from fraction 10 melted at 188–190° C. and that from fraction 11 at 188.5–190° C. The optical rotation of the latter crop was $[\alpha]_D^{24.5}+62.9°$ (20.0 mg. in 2.0 cc. of chloroform).

The fractions 12 and 13 residues were separately recrystallized from acetone, each yielding one crop of crystalline ethyl 3,5,19-trihydroxy-etiocholanate, one weighing 0.0516 gram and melting at 184–187° C. and the other 0.0170 gram and melting at 184–189.5° C.

The residues from drying the mother liquors of fractions 8 through 11 (0.0369 gram) and from fractions 12 and 13 (0.1395 gram) were combined and subjected to a similar, separate chromatographic separation, yielding a number of crystalline fractions, totaling 0.0375 gram of ethyl 3,5,19-trihydroxy-etiocholanate, melting above 185° C. This made the total yields of pure samples of this substance 0.2287 gram from both chromatograms.

*Example VI.—3,5,19-trihydroxy-etiocholanic acid*

The acid fraction derived from the ethylacetate solution of the product of the hydrogenation described in Example IV (second paragraph, first sentence; contained in the combined two sodium carbonate extracts and five water washings which followed them), as so combined, was made acid to Congo paper by the addition of 2.5 cc. of concentrated hydrochloric acid while cooling by the addition of ice. This caused the formation of a cheesy precipitate which was then thoroughly extracted with separate portions of ethylacetate, first 75 cc., then 50 cc., and then three of 40 cc. each. These ethylacetate extracts were combined and washed six times with 2 cc. each of water, and then dried with anhydrous sodium sulfate and filtered. The filtrate solution was evaporated to dryness yielding 0.1881 gram of a colorless resin as the acid fraction.

This acid fraction was then dissolved in a little acetone. On standing overnight, there separated 11.4 milligrams of crystalline 3,5,19-trihydroxyetiocholanic acid melting at 240-247° C. (to a light brown liquid, followed by effervescence), and having the structure:

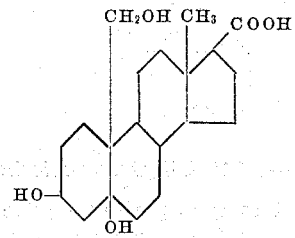

From the mother liquor there separated a second crystalline crop, 26.0 milligrams, melting between 210-230° C. (to a yellow liquid, followed by effervescence).

The dehydration described in Example I (column 3) did not go to completion because it yielded a certain amount of ethyl 3,5,14,19-tetrahydroxy-14-iso-etiocholanate as pointed out in column 17. Accordingly, a second dehydration was carried out under slightly more vigorous conditions.

1.2716 grams of recrystallized 3,5,14,19-tetrahydroxy-14-iso-etiocholanic acid was dissolved in 130 cc. of a one-tenth normal solution of hydrogen chloride in absolute alcohol, and refluxed (kept at a temperature of 87° C.) over a paraffin bath for one hour. It was then distilled at atmospheric pressure at a slow rate with the bath temperature at 92-95° C. for 90 minutes, and finally at a more rapid rate, with the bath temperature raised to 100° C. for 45 minutes. To the residue, about 40 cc. of a yellowish solution, there was added 30 cc. of water, and the distillation then continued under vacuum (45-50° C.) until there appeared a distinct turbidity. This was brought into solution by briefly heating on a water bath. The solution was then allowed to stand overnight at room temperature. There separated some resinous material and also yellowish needles.

The crystals and the resinous material were separated (just as described in columns 3 and 4) by frequent washing of the admixed and adhered resin from the crystals by aqueous alcohol (1:1). The dry weight of the yellow needle crystals was 45.8 milligrams, melting at 91-93° C.

*Example VII.—Ethyl 3,5,19-trihydroxy-etiocholanate*

Following the immediately preceding separation of the crystals from the mother liquor containing the resinous material, the alcohol was completely removed by distillation under vacuum, producing in the residue an oily precipitate. The latter dissolved by the addition of 100 cc. of ether, and the resulting lower aqueous phase was separated and extracted 5 times with 50 cc. portions each of ether, which ether washes were combined with the original ether phase. The combined ether solution was washed five times with 3 cc. portions each of water and then separated into a neutral fraction and an acid fraction by extracting this ether solution successively with 10 cc. and then 5 cc. of a 5% solution of sodium carbonate followed by 7 washes with 3 cc. each of water. The two sodium carbonate extractions and the seven water washes were combined and contained the acid fraction extracted from the resinous, oily material, and their further treatment is described in Example X.

The remaining ether solution (now freed of the acid fraction) containing the neutral fraction, was dried with sodium sulfate which was then filtered off, and the solution evaporated to dryness yielding 1.085 grams of a colorless, brittle foam as the neutral residue.

Petroleum ether was then added very gradually (as described in column 4), to a solution of this neutral residue in 4 cc. of ether, and there formed only a resinous precipitate. This, together with the supernatant solution, was then evaporated to dryness and subjected to catalytic hydrogenation thus:

450 milligrams of platinum oxide were suspended in 7 cc. of glacial acetic acid and, while being shaken, were reduced in an atmosphere of hydrogen. Then a solution of 1.080 grams of the dried neutral residue in 12 cc. of glacial acetic acid was added and the shaking continued in an atmosphere of hydrogen at room temperature (26° C.) for three and one-half hours. Total hydrogen absorption was 68.7 cc. The platinum was filtered off and the filtrate solution immediately evaporated under vacuum (45-50° C.) to dryness. To the syrupy residue, 5 cc. of water was added at once. The next day the wax-like, semi-crystalline material was dissolved in 100 cc. of ethylacetate, and the water phase was separated from the ethylacetate solution phase which latter was made neutral by washing it successively with 5 cc. and then 2 cc. of a 5% solution of sodium carbonate followed by five washings of 2 cc. each of water. After drying with anhydrous sodium sulfate and filtering off the latter, the ethylacetate was removed by heating under vacuum continued until the residue was brought completely to dryness, yielding 1.0404 grams of resinous residue. This residue was then dissolved in a small volume of acetone and after seeding with an authentic sample of ethyl 3,5,19-trihydroxyetiocholanate, separation of stout, prismatic crystals began immediately. The following day the crystals were filtered off and dried, weighing 0.3474 gram melting at about 170-175° C., and identified as moderately pure ethyl 3,5,19-trihydroxy-etiocholanate, giving a mixed melting point of 177° C. with a pure authentic sample of the substance.

*Example VIII.—Ethyl 3,5-dihydroxy-8,19-oxido-etiocholanate*

From the last filtrate, 0.0368 gram of definitely impure crystalline material, melting at 155-158° C., was obtained, the mother liquor from which, on being brought completely to dryness, gave 0.5740 gram of resinous residue. The residue was dissolved in 60 cc. of ether and subjected to chromatographic adsorption by filtration within 80 minutes through 16 grams of Brockmann aluminum oxide in a 20 mm. diameter column. The following eluates were obtained after passing through within 25-40 minutes each.

CHROMATOGRAPHIC FRACTIONATION

| No. of Fraction | Solvent | Weight of Residue g. | Appearance of Residue |
|---|---|---|---|
| 1 | 60 cc. ether (original solution). | 0.0693 | resinous. |
| 2 | 40 cc. ether+20 cc. acetone. | 0.1382 | partly crystalline resin. |
| 3 | 20 cc. ether+40 cc. acetone. | 0.0251 | crystalline. |
| 4 | 60 cc. acetone | 0.0338 | Do. |
| 5 | 60 cc. acetone+0.15 cc. methanol. | 0.0255 | partly crystalline resin. |
| 6 | 60 cc. acetone+0.20 cc. methanol. | 0.0097 | crystalline. |
| 7 | 60 cc. acetone+0.30 cc. methanol. | 0.0065 | resinous. |
| 8 | 60 cc. acetone+0.40 cc. methanol. | 0.0117 | partly crystalline resin. |
| 9 | 60 cc. acetone+0.50 cc. methanol. | 0.0288 | crystalline. |
| 10 | 59 cc. acetone+1 cc. methanol. | 0.0461 | Do. |
| 11 | 58 cc. acetone+2 cc. methanol. | 0.0640 | foamy glass. |
| 12 | 55 cc. acetone+5 cc. methanol. | 0.0647 | Do. |
| 13 | 45 cc. acetone+15 cc. methanol. | 0.0293 | Do. |
| 14 | 60 cc. methanol | 0.0153 | semi-crystalline. |
| | Total | 0.5680 | |

Each of the residues of this chromatographic fractionation was separately recrystallized. When fractions 2, 3 and 4 were recrystallized from acetone, a number of crops of dagger-shaped crystals of ethyl 3,5-dihydroxy-8,19-oxido-etiocholanate were obtained, which first melted around 170° C. and then solidified and remelted at between 185° C. and 190° C. Total yield 42 milligrams. When tetranitromethane was added to a sample dissolved in chloroform, no yellow color was observed.

Example IX.—Ethyl 3,5,19-trihydroxy-etiocholanate

When the fractions 9 and 10 residues were recrystallized from acetone, a total of only 40.8 milligrams of transparent rod-shaped crystals, melting points between 170° C. and 180° C., were obtained, of moderately pure ethyl 3,5,19-trihydroxy-etiocholanate, as established by the determination of mixed melting point with an authentic sample.

While the dehydration of the tetrahydroxy starting material was carried out in Examples I and VI by the use of absolute ethyl alcohol, the same dehydration takes place when there is used instead any other suitable absolute alcohol, such as any of the other absolute lower aliphatic alcohols as methyl, propyl, isopropyl, or butyl alcohols, and the like. By such substitution there is obtained in the steps after the dehydration, instead of an ethyl ester of the unsaturated trihydroxy acid, the 8,19-oxidodihydroxy acid and the saturated trihydroxy acid, the resulting methyl 3,5,19-trihydroxy-$\Delta^{14}$-etiocholenate and methyl 3,5-dihydroxy-8,19-oxido- and 3,5,19-trihydroxy - etiocholanates; propyl 3,5,19 - trihydroxy - $\Delta^{14}$ - etiocholenate, and propyl 3,5-dihydroxy-8,19-oxido- and 3,5,19-trihydroxy-etiocholenates, and the corresponding isopropyl ester of each of this one unsaturated acid and of the two saturated acids; and butyl 3,5,19-trihydroxy-$\Delta^{14}$-etiocholenate, and butyl 3,5-dihydroxy-8,19-oxido-, and 3,5,19-trihydroxy-etiocholanates, and the like other lower alkyl esters of the corresponding three acids.

Example X.—3,5,19-trihydroxy-$\Delta^{14}$-etiocholenic acid

The combined sodium carbonate extractions and water washings containing the acid fraction extracted from the resinous, oily material, as described in the first paragraph of Example VII, were made acid to Congo paper by adding 2.5 cc. of concentrated hydrochloric acid, and the acid fraction was then isolated from this solution by extracting once with 100 cc. and then 5 times with 40 cc. portions each of ether. These ether extracts were combined, washed 5 times with 3 cc. of water each, and then dried with anhydrous sodium sulfate and filtered. The filtrate solution,* on evaporation to dryness, yielded 0.1186 gram of a slightly yellow resin as the acid residue, containing the 3,5,19-trihydroxy-$\Delta^{14}$-etiocholenic acid having the structure:

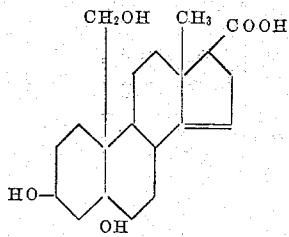

Example XI.—3,5,19-trihydroxy-etiocholanic acid (a) 50 milligrams of platinum oxide were suspended in 3 cc. of glacial acetic acid, and reduced with shaking in an atmosphere of hydrogen. Then a solution of this 0.1186 gram of acid residue in 4 cc. of glacial acetic acid was added and the shaking in an atmosphere of hydrogen continued for three hours; total hydrogen absorption 8.9 cc. at 26° C. The platinum was then filtered off and the solution filtrate brought to dryness under vacuum. To the resulting resinous residue was added 3 cc. of water, and by kneading it, on the following day, several times with 0.5 cc. portions each of water, it finally became crumbly and filterable. After filtration and drying, its weight was 0.094 gram. This material recrystallized from acetone or acetone-petroleum ether yielded three crops of crystals, total 25.9 milligrams, melting between 230° C. and 255° C. (On bringing the mother liquor to dryness it yielded 66.9 milligrams of resin.) The three crops of crystals were combined and recrystallized from acetone as pure 3,5,19-trihydroxy-etiocholanic acid in white, broad, flat needles melting at 250-252° C. (weight 12.7 mg.), giving no depression of melting point when mixed with an authentic sample of this acid. From the mother liquor, 5.8 milligrams of crystalline material, melting at 245-252° C., was obtained.

(b) While in section (a) of this example the product of the example was obtained by using as starting material the product of Example X and consequently hydrogenating the unsaturated corresponding $\Delta^{14}$-etiocholenic acid contained in that acid residue starting material, the same saturated acid of this Example XI was obtained by saponification of the corresponding alkyl 3,5,19-trihydroxy-etiocholanate, thus:

0.17 gram of potassium hydroxide dissolved in 1.0 cc. of methanol was added to a solution of 36.8 milligrams of purest ethyl 3,5,19-trihydroxy-etiocholanate (as derived from Example III, first paragraph) in 2.5 cc. of methanol. After refluxing the mixture on a water bath for two hours, 2 cc. of water was added, and the solution brought almost to dryness under vacuum, and the residue taken up in 5–6 cc. of water. The suspended crystalline material was extracted by shaking with 10 cc. of ether, and the ether phase washed three times with 1 cc. portions each of water. After drying with anhydrous sodium sulfate and then filtering it off, the ether solution filtrate was brought to dryness under vacuum, yielding 29.5 milligrams of crystalline neutral residue.

The aqueous washings were combined with the alkaline solution phase and the whole made acid to Congo paper by addition of 1 cc. of concentrated hydrochloric acid, while cooling with ice. The resulting emulsion from which a fine white precipitate soon separated was extracted with 10 cc. of ether to which, because of the insolubility of the precipitate, 10 cc. of ethyl acetate had to be added. Thereafter, the emulsion was extracted five times with 10 cc. each of ethyl acetate to dissolve all of the suspended white material. Then the aqueous phase was extracted once more with 10 cc. of ethyl acetate. All of these extracts were combined and washed once with 2 cc. and 4 times with 1 cc. portions each of water, and after drying with anhydrous sodium sulfate and then filtering it off, the filtrate solution was evaporated to dryness under vacuum. This crystalline acid residue, dried in a vacuum desiccator over solid KOH, and weighting 53.8 milligrams, was dissolved in the required amount (10–11 cc.) of acetone. On concentrating the solution over a water bath to a smaller volume (about 2 cc.), suddenly crystallization of the substance in bunches of flat, spear-shaped crystals set in, and the crystallizing solution was left standing at room temperature for a few hours. After filtering off the crystals and drying them, they weighed 28.2 milligrams, melting at 259–260° C. By concentrating the mother liquor additional crops of rather pure product were obtained, one of 15.1 milligrams melting at 256.5–258° C., and another of 1.8 milligrams melting at 254–256° C. All three crops melted to a light brown liquid with subsequent effervescence. Optical rotation, determined on the first crop, was $[\alpha]_D^{25} +69.5°$ (8.0 mg. in 2.0 cc. of acetone).

*Example XII.—Methyl 3,5,19-trihydroxy etiocholanate*

(a) A solution in ether of 29.5 milligrams of the neutral crystalline residue (from the penultimate paragraph of Example XI) was concentrated on a water bath until crystallization started. The next day 17.7 milligrams of stout, ruler-shaped crystals were filtered off, melting at 208–211° C., obviously representing a mixture of the ethyl and methyl esters of 3,5,19-trihydroxy-etiocholanic acid.

By concentrating the filtrate on a water bath, 4.8 milligrams of additional crystalline material, melting at 222.5–224° C. was recovered. This was pure methyl 3,5,19-trihydroxy-etiocholanate. It caused no depression of melting point when mixed with an authentic sample of the compound. On bringing down to dryness the mother liquor from this last crop, 6.1 milligrams of a crystalline residue was left.

(b) While a different alkyl ester of 3,5,19-trihydroxy-etiocholanic acid has been shown in the section (a) of this example as obtainable by the method of trans-esterification of one alkyl ester, namely, the ethyl ester, in the presence of an excess of a different aliphatic alcohol, and particularly another lower alkyl alkanol, as methanol, these same alkyl and other esters can also be obtained by direct esterification of the free acid with a suitable diazo reagent, for example, a diazo-alkane or aromatic diazonium salt. The present section of this example illustrates this alternate method:

To a solution of 26.6 milligrams of 3,5,19-trihydroxy-etiocholanic acid in 5 cc. of acetone, there was added at 0° C. a slight excess of an ethereal solution of diazo-methane. After standing at room temperature for twenty minutes, the excess diazomethane was removed over a water bath and then the resulting colorless solution was evaporated to dryness under vacuum. The crystalline residue was dissolved in 15 cc. of ether and this solution made neutral by washing it successively with 1 cc. of normal hydrochloric acid, 1 cc. of water, 1 cc. of a 5% solution of sodium carbonate, and 3 times with 1 cc. portions each of water. The solution was then dried with anhydrous sodium sulfate and, after filtration, was evaporated to a small volume on a water bath. Crystallization started spontaneously in characteristic hexagonal platelets. After standing for sometime at room temperature, the methyl 3,5,19-trihydroxy-etiocholanate was filtered off and dried, weight 15.2 milligrams, melting at 220–222.5° C.; optical rotation $[\alpha]_D^{23.5} +61.3°$ (8.0 mg. in 2.0 cc. of chloroform). After concentrating the mother liquor, a second crop of 3.8 milligrams of similar looking crystals, melting at 218–220.5° C., was obtained.

Other similar esters of 3,5,19-trihydroxy-etiocholanic acid are obtained by replacing the diazo-methane of Example XII (b) by the corresponding diazo reagent, R—N$_2$, in which R is the hydrocarbon radical replacing the methyl group in the methyl ester of the example, such as reacting said acid starting material under reaction conditions as in Example XII (b) with the required corresponding diazoalkane, or with the desired corresponding diazo (lower)-alkane as diazoethane, diazopropane, diazobutane, and the like, or by reacting the 3,5,19-trihydroxy-etiocholanic acid with the desired corresponding aryl diazonium salt to introduce the desired aryl group when R (in the general formula of claim 1) is aryl, for example, with a phenyl diazonium halide as the chloride, and the like, and obtaining phenyl 3,5,19-trihydroxy-etiocholanate, and the like other aryl esters of this acid. The corresponding esters, both when R is an alkyl as well as an aryl hydrocarbon, can be made also by the procedure of esterifying the 17-carboxyl group with an alcohol. This procedure is used when instead of the methyl group as in the ester of Example XII, there is desired the corresponding ester having an aralkyl group as benzyl, for example, obtained by esterification of the acid with benzyl alcohol, yielding benzyl 3,5,19-trihydroxy-5-hydroxy-etiocholanate.

*Example XIII.—Ethyl 3,19-diacetoxy-5-hydroxy-etiocholanate*

To a solution of 108 milligrams of pure ethyl 3,5,19-trihydroxy-etiocholanate in 0.4 cc. of pyridine there was added 0.4 cc. acetic anhydride, and the mixture allowed to stand at room temperature for 22 hours. It was then concentrated under vacuum (65° C.) to a viscous colorless oil which was then dissolved in 25 cc. of ether, neutralized by shaking it successively twice with 2 cc. portions each of normal hydrochloric acid, twice with 2 cc. each of a 5% solution of sodium carbonate and 5 times with 1 cc. each of water, and then dried with anhydrous sodium sulfate. After filtering off the latter, the solution filtrate was evaporated to dryness leaving a colorless resin (weight 127.5 mg.) which partly crystallized on standing overnight in a vacuum desiccator. After adding a little ether to the resin-crystal mixture, the material went completely into solution, and then after standing a short time, some white crystals of ethyl 3,19 - diacetoxy - 5 - hydroxy - etiocholanate separated out. After filtering these off and drying them (weight first crop 39.0 mg.) they melted at 108–109.5° C., and showed optical rotation of $[\alpha]_D^{22.5}+60.3°$ (20.0 mg. in 2.0 cc. of chloroform).

Upon concentrating the filtrate to a smaller volume, filtering off the additional crystals, and similarly concentrating the subsequent filtrates, additional crops were obtained, the first of 31.3 milligrams melting at 107–108° C., the second of 22.4 milligrams melting at 103–105° C., and the last of 12.4 milligrams melting at 97–101.5° C.

If in the procedure of this Example XIII, the acetic anhydride is replaced by the corresponding anhydride of another aliphatic acid or aromatic or aryl-aliphatic acid, there is obtained the corresponding ethyl 3,19-dialkoyloxy (or -aroyloxy or -aralkoyloxy)-5-hydroxy-etiocholanate, for example, ethyl 3,19-dibenzoyloxy-5-hydroxy-etiocholanate.

Likewise, if instead of starting with the ethyl 3,5,19-trihydroxy-etiocholanate, there was used instead in Example XIII any other 17-alkyl (or -aryl, or -aralkyl) ester, and the procedure carried out as in the example but with benzoic acid anhydride, there results the corresponding alkyl (or aryl or aralkyl) 3,19-diacyloxy-5-hydroxy-etiocholanate, for example, benzyl 3,19-dibenzoyloxy-5-hydroxy-etiocholanate.

*Example XIV.—3,5-dihydroxy-8,19-oxido-etiocholanic acid*

To a solution of 34.9 milligrams of ethyl 3,5-dihydroxy-8,19-oxido-etiocholanate dissolved in 1 cc. of methanol was added 70 milligrams of potassium hydroxide dissolved in 1 cc. of methanol. The mixture was refluxed for two hours and then kept at room temperature for about 30 minutes. Thereafter 3 cc. of water was added and the solution concentrated under vacuum to about 1 cc. volume. After adding 3 cc. of water, the resulting turbid solution was extracted four times with 5 cc. portions each of ether, and the ether phases were combined. The combined ether phases were then washed three times with 1.5 cc. each of water, the separate water layers drawn off, and the washed ether solution dried with anhydrous sodium sulfate and then filtered and the solution filtrate evaporated to dryness, leaving 4.1 milligrams of crystalline neutral residue.

The aqueous phases drawn off from the preceding ether extraction were combined and made acid to Congo paper by addition of 0.5 cc. of concentrated hydrochloric acid, while cooling with ice. This produced a turbidity from which there separated promptly a white, apparently crystalline precipitate which was then extracted 7 times with 5 cc. portions each of ethyl acetate. The ethyl acetate extracts were combined, washed 5 times with 1 cc. each of water, dried with anhydrous sodium sulfate and filtered. The solution filtrate was evaporated completely to dryness and then kept over night in a vacuum desiccator over potassium hydroxide, yielding 27.6 milligrams of crystalline acid residue which was then dissolved in 10 cc. of acetone and the solution concentrated on a water bath to about 3 cc. After standing at room temperature for a few hours, white, scaly microcrystals of 3,5-dihydroxy-8,19-oxido-etiocholanic acid were filtered off, having the structure:

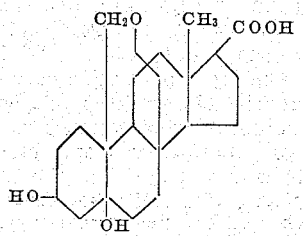

weight 6.6 milligrams, melting at 286–288° C., optical rotation $[\alpha]_D^{29.5}+77.3°$ (3.6 mg. in 2.0 cc. of acetone). By concentrating the mother liquor, filtering off the crystals obtained, and repeating with the subsequent filtration mother liquors, additional crops of fairly pure crystals were obtained, the second crop weighing 5.4 milligrams and melting at 285.5–287.5° C.; the third of 2.9 milligrams melting at 281–283° C., and the fourth of 0.6 milligram melting at 283–286° C. The final mother liquor was evaporated under vacuum to dryness, leaving 8.9 milligrams of crystalline residue.

*Example XV.—Methyl 3,5-dihydroxy-8,19-oxido-etiocholanate*

(a) 8.9 milligrams of crystalline 3,5-dihydroxy - 8,19 - oxido - etiocholanic acid (Example XIV) was dissolved in 6 cc. of acetone and concentrated over a water bath to about 4 cc. To the solution at 0° C. was added an excess of ethereal solution of diazomethane and the mixture allowed to stand in the cold for about 10 minutes and then at room temperature about 25 minutes, and then evaporated under vacuum to dryness to a white residue. This residue was then dissolved in 45 cc. of ether and this solution neutralized by washing it successively with 1 cc. of normal hydrochloric acid, 1 cc. of water, 1 cc. of a 5% solution of sodium carbonate, and 3 times with 1 cc. portions each of water. The solution was then dried with anhydrous sodium sulfate and after filtering off the latter, was evaporated to dryness, yielding 9.8 milligrams of white crystalline residue. This residue was then treated with some acetone and after filtering off the white crystalline material, the filtrate yielded 4.9 milligrams of microscopic, flat, short needle crystals of the methyl 3,5-dihydroxy-8,19-oxido-etiocholanate, melting at 270–274° C. (to a brown liquid). 3.3 milligrams of white crystalline residue was obtained by evaporating the filtrate from the needle crystals under vacuum to dryness.

(b) The 8.9 milligram crystalline residue of 3,5-dihydroxy - 8,19 - oxido-etiocholanic acid obtained from the final mother liquor in Example XIV was similarly methylated, and on working up its reaction mixture in the same manner as in the preceding portion (a) of this example, there was obtained 1.3 milligrams of microscopic needle crystals melting at 272–276° C. (to a brown liquid). On evaporating the filtrate from this crystallization under vacuum to dryness, 6.9 milligrams of resinous residue was obtained.

Other similar alkyl esters, as well as aryl and aralkyl esters, of 3,5-dihydroxy-8,19-oxido-etiocholanic acid are obtained by replacing the diazo-methane by the required corresponding diazo-alkane, or corresponding aryl diazonium salt, and following the procedure of this example, or by the procedure of esterifying the carboxyl group with an aralkyl alcohol, as explained in the paragraph preceding Example XIII.

By reacting 3,5,19 - trihydroxy - etiocholanic acid, or either the corresponding Δ$^{14}$-etiocholenic or -8,19-oxido-etiocholanic acids, or any alkyl, aryl, or aralkyl ester of either of these three acids, with an esterifying agent, for example, an acid anhydride as acetic anhydride or phenylacetic anhydride, or an acid halide as benzoyl chloride, or an acid as glacial acetic acid or phenylsulfonic acid, under mild esterification conditions there results the corresponding derivatives of each of the three acids or of any of their indicated 17-carboxylic esters, in which the hydroxyl groups attached to both the 3- and 19-carbon atoms are converted to alkoyloxy, aroyloxy, aralkoyloxy, or arylsulfonyloxy groups, for example, 3,19 - di - (phenylsulfonyloxy) - 5 - hydroxy-etiocholanic (or Δ$^{14}$-etiocholenic) acid and 3 - phenylsulfonyloxy - 5 - hydroxy - 8,19 - oxido-etiocholanic acid, or the corresponding alkyl (aryl or aralkyl) 3,19-di-(phenylsulfonyloxy)-5-hydroxy-etiocholanic (or Δ$^{14}$-etiocholenic) acid and 3-phenylsulfonyloxy-5-hydroxy-8,19-oxido-etiocholanic acid.

*Example XVI.—Lactone of empirical formula $C_{20}H_{28}O_4$*

The colorless crystals remaining at the end of the procedure described in the first paragraph of Example I above, when dried, weighed 42.7 milligrams and melted at about 97–99.5° C., representing the lactone having the probable formula:

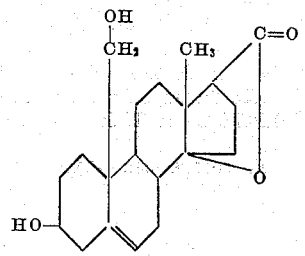

This substance proved to be essentially insoluble in a 5% solution of sodium carbonate. On treating a chloroform solution of it with tetranitromethane, a distinct yellow color, indicative of its unsaturated character, formed. Its recrystallization was difficult.

*Example XVII.—Ethyl 3,5,14,19-tetrahydroxy-14-iso-etiocholanate*

The hard white crystals obtained from the neutral portion extracted from the oily residue A following the original dehydration step (as described in the fourth paragraph of Example I above) after being washed with ether containing some petroleum ether, on drying weighed 0.0724 gram, and were identified as ethyl 3,5,14,19-tetrahydroxy-14-iso-etiocholanate, melting at about 164–169.5° C. These crystals were then dissolved in acetone and the solution concentrated to a small volume on a water bath. Then on adding some petroleum ether at room temperature, separation of sheaves of spear-shaped crystals began at once. The crystals, filtered off the next day and dried, weighed 44.2 milligrams, melting at 186–188.5° C.; optical rotation $[\alpha]_D^{23.5}+45.7°$ (20.0 mg. in 2.0 cc. of chloroform).

The fraction 14 residue from the chromatographic fractionation described in Example IV was recrystallized from a small volume of acetone to which an equal amount of petroleum ether was added. About 11 milligrams separated as crystalline scales, melting at 186–189° C., and showing no depression of melting point when mixed with an authentic sample of ethyl 3,5,14,19-tetrahydroxy-14-iso-etiocholanate. This compound illustrates another example of the alkyl esters of 3,5,14,19 - tetrahydroxy-14-iso-etiocholanic acid, which alkyl esters of this acid are referred to in the last paragraph of Example 5 of application Serial No. 666,191, now Patent 2,518,672.

All melting points were determined with the Fisher-Johns melting point apparatus. The readings were sufficiently near the true melting points so that no corrections have been made.

The products of the invention are useful as intermediates in the preparation of other compounds, and some of them have certain therapeutic effectiveness.

It will be understood, with reference to the various compounds illustrated and described in this specification and its claims, that I do not intend that the invention of any of the compounds described or claimed shall be limited to any particular stereochemical configuration about any carbon atom, and, in particular, about carbon atoms 3,5,10,14 and 17.

The 3,5,14,19-tetrahydroxy-14-iso-etiocholanic acid starting material for the products described in this specification is prepared by oxidizing, for example, 5.0 grams of strophanthidol-3,19-diacetate dissolved in 294 cc. of acetone with 4.84 grams of potassium permanganate, distilling off the acetone under vacuum, diluting the residue with water to produce a sludge, acidifying the sludgy mixture to Congo paper with 10% sulfuric acid, extracting the sludge with ether, extracting an acid constituent from the ether extract by treating the latter with 5% solution of sodium carbonate, making the sodium carbonate extraction acid to Congo paper using 10% sulfuric acid, causing a sticky precipitate to appear, extracting the precipitate mixture with ether, washing the ether extract with water and drying it with anhydrous sodium sulfate, filtering off the latter, and bringing the solution filtrate completely to dryness under vacuum, yielding 3,5,14,19-tetrahydroxy - 14 - iso - etiocholanic acid, 3,19-diacetate; then hydrolyzing this diacetate in methanol, for example, 3 grams in 15 cc. of methanol, and adding a solution of 4.5 grams of potassium hydroxide in 60 cc. of methanol, refluxing on a water bath, adding 150 cc. of water, concentrating under vacuum to about 65 cc., cooling the solution by immersing its container in an ice bath, and making the solution acid to Congo paper, using concentrated hydrochloric acid, extracting with ethyl acetate the resulting mixture, washing the extract with water, and then drying it with anhydrous sodium sulfate, filtering off and concentrating the filtrate under vacuum to about 40–45 cc., permitting the separation of microcrystalline 3,5,14,19-tetrahydroxy-14-iso-etiocholanic acid to continue overnight.

This application is in part a continuation of my copending application Serial No. 713,925, now abandoned, which in turn is in part a continuation of application Serial No. 666,191, now Patent 2,518,672.

While the invention has been illustrated by certain specific embodiments of it, it is understood that various substitutions and modifications may be made therein without departing from the invention, within the available scope of the appending claims.

What I claim is:

1. A compound selected from the group consisting of:

(a) 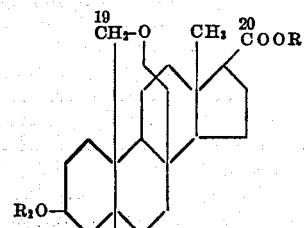

(b) 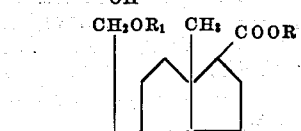

(c) 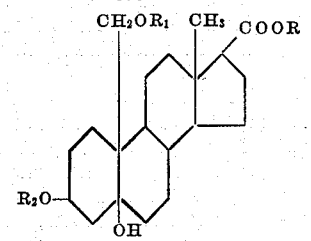

in which R is selected from the group consisting of hydrogen and a lower alkyl radical, $R_1$ is selected from the group consisting of hydrogen and a lower acyl radical, and $R_2$ is selected from the group consisting of hydrogen and a lower aliphatic acyl radical.

2. The compound:

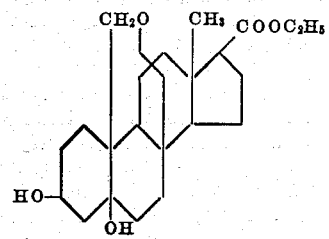

3. The compound:

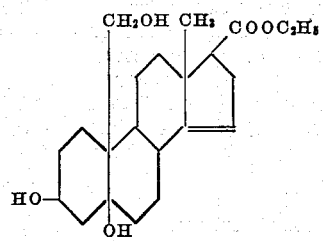

4. The compound:

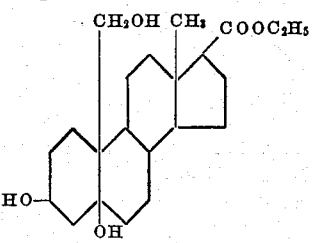

5. In the process of preparing a 3,5-dihydroxy-10-hydroxymethane-17-carboxy-estrane, the step of dehydrating 3,5,14,19-tetrahydroxy etiocholanic acid by the use of acidulated alcohol thereby removing the hydroxyl group from the 14-position forming a compound selected from the class consisting of those in which (a) the carbon atoms in the 10- and 8-positions are joined by a methylenoxy linkage and the carbon atoms in the 14- and 15-positions are joined by a single bond, and (b) the carbon atoms in the 8- and 14-positions are joined by a single bond and the carbon atoms in the 14- and 15-positions are joined by a double bond; and simultaneously esterifying the 17-carboxyl group.

6. The process as claimed in claim 5 wherein the dehydration is performed under anhydrous conditions.

7. The process as claimed in claim 5 wherein the alcohol is acidulated with a mineral acid.

MAXIMILIAN R. EHRENSTEIN.

No references cited.